(12) United States Patent
Adamczyk (10) Patent No.: US 10,831,224 B2
(45) Date of Patent: Nov. 10, 2020

(54) CONTROL OF VOLTAGE SOURCE CONVERTERS

(71) Applicant: GENERAL ELECTRIC TECHNOLOGY GMBH, Baden (CH)

(72) Inventor: Andrzej Adamczyk, Stafford (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 39 days.

(21) Appl. No.: 16/303,463

(22) PCT Filed: May 17, 2017

(86) PCT No.: PCT/EP2017/061861
§ 371 (c)(1),
(2) Date: Nov. 20, 2018

(87) PCT Pub. No.: WO2017/198724
PCT Pub. Date: Nov. 23, 2017

(65) Prior Publication Data
US 2020/0209904 A1 Jul. 2, 2020

(30) Foreign Application Priority Data
May 20, 2016 (GB) .................................. 1608922.9

(51) Int. Cl.
*G05F 1/575* (2006.01)
*G05F 1/573* (2006.01)
(Continued)

(52) U.S. Cl.
CPC .............. *G05F 3/08* (2013.01); *H02M 1/32* (2013.01); *H02M 7/483* (2013.01);
(Continued)

(58) Field of Classification Search
CPC .................................. G05F 1/573; G05F 1/575
(Continued)

(56) References Cited

U.S. PATENT DOCUMENTS 7,162,656 B2 * 1/2007 Vogman .................... G06F 1/28
323/276
2010/0156363 A1 * 6/2010 Chiu ...................... H02J 7/0091
323/274
(Continued)

FOREIGN PATENT DOCUMENTS

CN 102931864 A 2/2013
CN 104092239 A 10/2014
CN 104682751 A 6/2015

OTHER PUBLICATIONS

Great Britain Search Report and Written Opinion dated Nov. 22, 2016 which was issued in connection with GB patent No. 1608922.9 which was filed on May 20, 2016.
(Continued)

*Primary Examiner* — Gary A Nash
(74) *Attorney, Agent, or Firm* — Eversheds Sutherland (US) LLP (57) ABSTRACT

This application relates to methods and apparatus for control of voltage source converters. The control apparatus has a reference voltage generator that generates a voltage control signal as part of a voltage control loop. The reference voltage generator may be a DC voltage/power controller operated to regulate DC voltage or power and may generate the voltage control signal based on a feedback DC voltage/power signal and a defined set-point. An overcurrent controller generates a current control signal for modulating the voltage control signal to prevent an overcurrent. The overcurrent controller generates the current control signal as part of a control path that is independent from the voltage control loop. The DC voltage/power controller may thus directly generate a voltage reference and may act to keep the DC voltage substantially constant over the time scale of short term transients, with the overcurrent controller providing current limiting only when required.

18 Claims, 3 Drawing Sheets

(51) Int. Cl.
*G05F 3/08* (2006.01)
*H02M 1/32* (2007.01)
*H02M 7/483* (2007.01)
*H02M 7/5387* (2007.01)
*H02M 1/00* (2006.01)

(52) U.S. Cl.
CPC ......... *H02M 7/53871* (2013.01); *G05F 1/573* (2013.01); *G05F 1/575* (2013.01); *H02M 2001/0025* (2013.01); *H02M 2007/4835* (2013.01)

(58) Field of Classification Search
USPC .............................. 323/274, 276, 280, 288
See application file for complete search history.

(56) References Cited

U.S. PATENT DOCUMENTS

| | | | | |
|---|---|---|---|---|
| 2013/0169262 | A1* | 7/2013 | Hartman | H02J 1/00 323/351 |
| 2014/0112038 | A1* | 4/2014 | Hasler | H02M 1/32 363/56.05 |
| 2014/0292298 | A1* | 10/2014 | Pradhan | H02M 3/1588 323/286 |
| 2016/0094037 | A1 | 3/2016 | Eren et al. | |

OTHER PUBLICATIONS

International Search Report and Written Opinion dated Aug. 30, 2017 which was issued in connection with PCT application No. PCT/EP2017/061861 which was filed on May 17, 2017.
Sreejith M R et. al.: Electrical source emulation using modular multilevel converter:, 2014 IEEE International Conference on Power Electronics, Drive and Energy Systems (PEDES), IEEE, Dec. 16, 2014, pp. 1-6.
Fouad Salha et al: "Virtual resistance principle for the overcurrent protection of PWM voltage source inverter", Innovative Smart Grid Technologies Conference Europe (ISGT Europe), 2010 IEEE PES, IEEE, Piscataway NY UDS Oct. 11, 2010 pp. 1-6.
Beltran H et al: "Analog Fixed Maximum Power Point control for PWM step-down converter for water pumping installations", 13th European Conference on Power Electronics and Applications, 2009: EPE '09; Sep. 8-10, 2009 pp. 1-10.
Hu et. al: Simulation Study of the Zhoushan Project as a Three-terminal DC Transmission System; 2012 IEEE.
Office Action issued in Chinese Application No. 201780030852.7, dated Apr. 8, 2020, with English Translation, 39 pages.
Office Action issued in European Application No. 17 724 033.0, dated Feb. 28, 2020, 7 pages.
Sreejith M R et al: "Electrical source emulation using modular multilevel converter", 2014 IEEE International Conference on Power Electronics, Drives and Energy Systems (PEDES), IEEE, Dec. 16, 2014 (Dec. 16, 2014), pp. 1-6.
Fouad Salha et al: "Virtual resistance principle for the overcurrent protection of PWM voltage source inverter", Innovative Smart Grid Technologies Conference Europe (ISGT Europe), 2010 IEEE PES, IEEE, Piscataway, NJ, USA, Oct. 11, 2010(Oct. 11, 2010 ), pp. 1-6.
Bel Tran H et al: "Analog Fixed Maximum Power Point control for a PWM step-down converter for water pumping installations", 13th European Conference on Power Electronics and Applications, 2009: EPE 09 ; Sep. 8-10, 2009, Barcelona, Spain, IEEE, Piscataway, NJ, USA, Sep. 8, 2009 (Sep. 8, 2009), pp. 1-10.
Jing Hu et al: "Simulation study of the Zhoushan project as a three-terminal DC transmission system", 2012 IEEE Power and Energy Society General Meeting ; San Diego, California, USA; Jul. 22-26, 2012, IEEE, Piscataway, NJ, Jul. 22, 2012 (Jul. 22, 2012), pp. 1-6.

* cited by examiner

Prior Art

CONTROL OF VOLTAGE SOURCE CONVERTERS

BACKGROUND

This application relates to methods and apparatus for control of voltage source converters, and especially to control of voltage source converters with embedded energy storage.

HVDC (high-voltage direct current) electrical power transmission uses direct current for the transmission of electrical power. This is an alternative to alternating current electrical power transmission which is more common. There are a number of benefits to using HVDC electrical power transmission.

In order to use HVDC electrical power transmission, it is typically necessary to convert alternating current (AC) to direct current (DC) and back again. To date most HVDC transmission systems have been based on line commutated converters (LCCs), for example such as a six-pulse bridge converter using thyristor valves. LCCs use elements such as thyristors that can be turned on by appropriate trigger signals and remain conducting as long as they are forward biased. In LCCs the converter relies on the connected AC voltage to provide commutation from one valve to another.

Increasingly however voltage source converters (VSCs) are being proposed for use in HVDC transmission. HVDCs use semiconductor switching elements such as insulated-gate bipolar transistors (IGBTs) that can be controllably turned on and turned off independently of any connected AC system. VSCs are thus sometime referred to as self-commutating converters.

VSCs typically comprise multiple converter arms, each of which connects one DC terminal to one AC terminal. For a typical three phase AC input/output there are six converter arms, with the two arms connecting a given AC terminal to the high and low DC terminals respectively forming a phase limb. Each converter arm comprises an apparatus which is commonly termed a valve and which typically comprises a plurality of elements which may be switched in a desired sequence.

In one form of known VSC, often referred to as a six pulse bridge, each valve comprises a set of series connected switching elements, typically insulated gate bipolar transistors (IGBTs) connected with respective antiparallel diodes. The IGBTs of the valve are switched together to electrically connect or disconnect the relevant AC and DC terminals, with the valves of a given phase limb typically being switched in anti-phase. By using a pulse width modulated (PWM) type switching scheme for each arm, conversion between AC and DC voltage can be achieved. In order to keep the DC voltage stable there is typically a relatively large DC capacitor bank between the DC terminals of the VSC. However, such VSCs typically tend to have a relatively large footprint and relatively high losses, meaning that such VSCs may not be suited for some large power HVDC installations.

In another known type of VSC, referred to as a modular multilevel converter (MMC), each valve comprises a chain-link circuit having a plurality of cells connected in series, each cell comprising an energy storage element, such as a capacitor, and a switch arrangement that can be controlled so as to either connect the energy storage element between the terminals of the cell or bypass the energy storage element. The cells are sometimes referred to as sub-modules, with a plurality of cells forming a module. The sub-modules of a valve are controlled to connect or bypass their respective energy storage elements at different times so as to vary over the time the voltage difference across the plurality of cells. By using a relatively large number of sub-modules and timing the switching appropriately the valve can synthesise a stepped waveform that approximates to a desired waveform, such as a sine wave, to convert from DC to AC or vice versa with low levels of harmonic distortion. As the various sub-modules are switched individually and the changes in voltage from switching an individual sub-module are relatively small a number of the problems associated with the six pulse bridge converter are avoided.

Other designs of VSC also use the principles of a chain-link for voltage wave shaping, e.g. providing a stepped voltage waveform as described, in a converter arm of a VSC for at least part of the power cycle. For instance a variant of a VSC referred to as an Alternate-Arm-Converter (AAC) has been proposed wherein a chain-link of a series of connected cells is provided in a converter arm for voltage wave-shaping but each converter arm is turned off for at least part of the AC cycle. Thus the plurality of series connected cells for voltage wave-shaping are connected in series with an arm switch, referred to as a director switch, which can be turned off when the relevant converter arm is in the off state and not conducting.

SUMMARY

Figure 1:
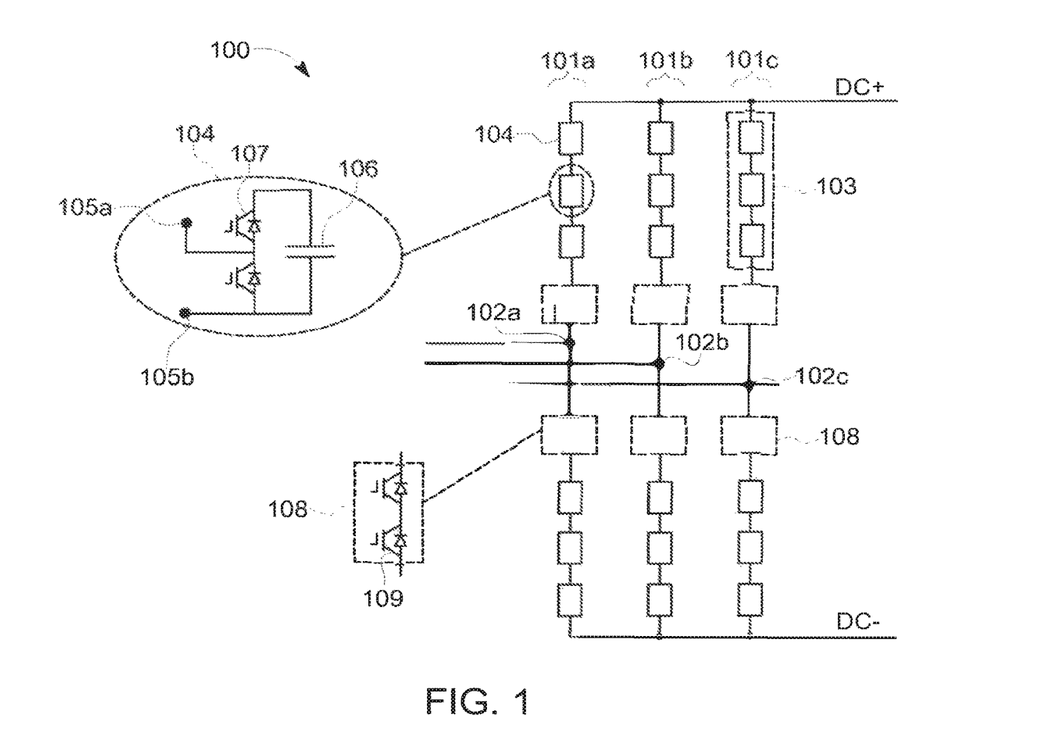
FIG. 1 illustrates an MMC-type voltage source converter.

FIG. 1 illustrates the principles of VSC 100 having chain-links for voltage wave-shaping. The example converter 100 illustrated in FIG. 1 has three phase limbs 101a-c, each phase limb having a high side converter arm connecting a relevant AC terminal 102a-c to the high side DC terminal DC+ and a low side converter arm connecting the relevant AC terminal 102a-c to the low side DC terminal DC−. Each converter arm comprises a chain-link circuit 103 comprising a plurality of cells 104 connected in series. In the example shown in FIG. 1 each cell 104 has terminals 105a, 105b for high-side and low-side connections respectively and comprises a capacitor 106 as an energy storage element. The capacitor 106 is connected with cell switching elements 107, e.g. IGBTs with antiparallel diodes, to allow the terminals 105a and 105b of the cell to be connected via a path that bypasses capacitor 106 or via a path that includes capacitor 106 connected in series. In the example illustrated in FIG. 1 each cell comprises two cell switching elements 107 in a half-bridge arrangement such that the capacitor can be connected in use to provide voltage difference of a given polarity between the terminals 105a and 105b. In some embodiments however at least some of the cells may comprise switching elements in a full-bridge arrangement such that the capacitor can be bypassed or connected to provide a voltage difference of either polarity.

In some designs of VSC, such as the AAC, the chain-link 103 in each converter arm is connected in series with an arm switch 108, which is often referred to as a director switch, which may comprise a plurality of series connected arm switching elements 109. The director switch of an arm may for example comprise high voltage elements with turn-off capability such as IGBTs or the like with antiparallel diodes.

It will of course be appreciated by one skilled in the art that in practice a converter arm may comprise other components such an inductances and the like and FIG. 1 illustrates just those components that are useful for understanding the principle of operation.

In the MMC-type design, as the energy storage elements of the chain-link cells can be controlled independently to provide multiple different voltage steps, the requirement for a large bank of DC capacitors between the DC terminals is much reduced and thus such a DC capacitor bank is typically omitted to save space and cost. The energy storage elements are effectively embedded within the converter switching topology and are not directly associated with the DC terminals.

The converter arm of such a VSC, and in particular the switching of cells of the chain-link circuit, are controlled with respect to a voltage reference for that valve. The valve voltage reference is effectively a notional voltage waveform that provides the desired power transmission characteristics for that phase of the VSC. Thus for example the valve voltage reference may be a time varying waveform with a frequency component related to the frequency of the AC system and a DC offset related to the DC voltage. It will be understood that a practical voltage reference for an MMC valve might have additional frequency components beside the AC network fundamental to enhance the converter performance or maximise equipment utilisation. However from the external system point of view it is the fundamental frequency AC and DC voltage components that are important. It will also be appreciated that MMC converters can, within the nominal range of operating conditions, independently control the AC side and the DC side output voltages. The DC offset of the valve voltage reference waveform may define the output DC voltage and thereby influences the DC output current and power. The AC component of the valve reference waveform may define the output AC voltage. The AC frequency (phase) and the AC amplitude of the valve reference voltage influence the output AC current and AC power (active and reactive).

Although the AC and DC components of the valve reference voltage can be set independently, due to limited energy storage offered by the MMC sub-module capacitors they normally need to be coordinated so as to equalize the power exchanged between the AC transmission system and the AC/DC converter and with the power exchanged between the AC/DC converter and the DC transmission system.

A valve controller for each valve will translate the valve voltage reference, fed by the upstream converter control, to a switching signal for each individual sub-module that will drive turning on and turning off of the individual semiconductor devices.

The switching elements of a VSC, e.g. switching elements 107, typically comprise power transistors such as IGBTs and, at present, most readily commercially available such transistors have a limited current overloading capability. Conventional VSCs are thus controlled so that the valve voltage, i.e. the valve voltage reference, is regulated by a fast acting current control loop so as to control the current through the switching elements.

Figure 2:
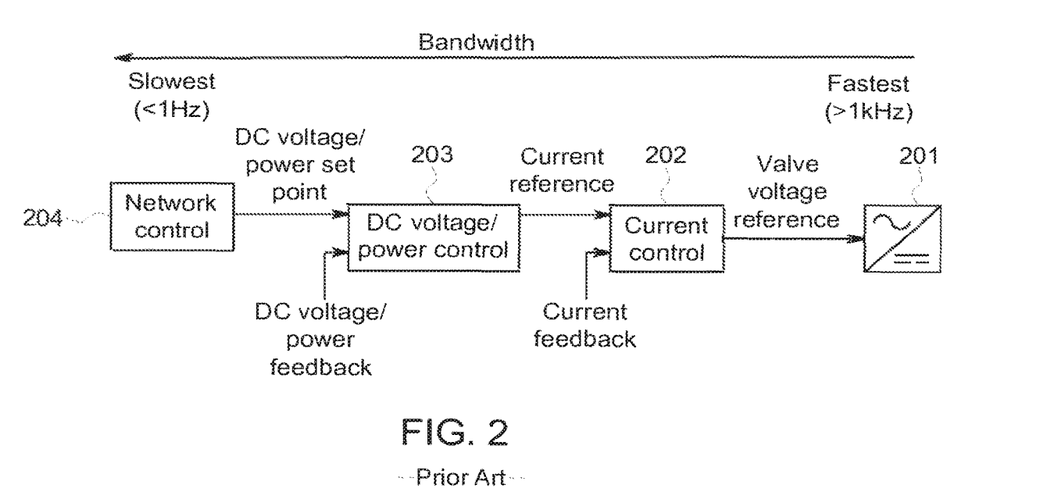
FIG. 2 illustrates the principles of conventional VSC valve control.

FIG. 2 illustrates the principles of conventional control of VSC 201. A current controller 202 compares the monitored current in the valve of the VSC to a current reference in order to set the voltage reference for the valve, e.g. the DC offset component of the voltage reference. The current reference is regulated by a further controller 203 which forms part of an outer control loop. For HVDC applications the VSC is usually controlled to regulate either DC voltage or power. The operating mode of DC voltage/power controller 203 of the outer control loop, e.g. DC voltage or power regulation, and operating set point may be provided by a network controller 204 and the outer loop controller 203 compares the actual DC voltage or power with the set point to provide an appropriate current reference.

It should be noted that FIG. 2 shows only those components relevant for DC side dynamics and omits many other AC/DC converter control functions, for instance AC voltage/reactive power control or converter energy balancing control, that may be present in a practical implementation.

This type of control means that if there was a DC network disturbance the inner current controller 202 would quickly regulate the valve voltage so that the output DC current would not vary significantly from its pre-disturbance value. This may result in a change in the DC voltage or power. Over time the slower outer control loop will update the current reference to bring the DC voltage or power back to the pre-disturbance level, whilst avoiding any overcurrent. However the bandwidth of the outer loop, including DC voltage/power controller 203, is such that over the timescale of the initial transient disturbance the current reference will not vary significantly. The overall behaviour of the VSC resembles the response from a current source.

Figure 3:
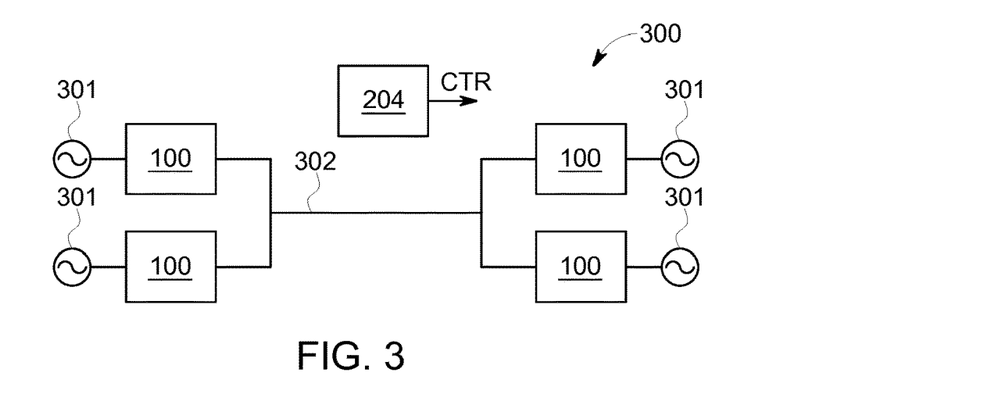
FIG. 3 illustrates an example of an HVDC network with a multi-terminal DC network.

Such control has been satisfactory for point-to-point DC networks, e.g. where a first VSC is connected to a second VSC via a DC link, as the currents and voltages of both VSCs are closely linked. Increasingly however it is being proposed to have multi-terminal DC networks e.g. where three or more VSCs may connect to a common DC network. FIG. 3 illustrates one example of a multi-terminal HVDC network 300 with a plurality of VSCs 100, each connected to a respective AC system 301 (which may be separate AC networks or different parts of the same AC network) and a common DC network 302. A network controller 204 may generate control signals CTR for controlling the operating mode of the VSCs 100. In such an implementation the DC voltage of the network may be seen (at least partly) as a common quality for all VSCs 100. It will be appreciated that individual VSCs 100 may experience different DC voltages to one another, due to voltage drops across the network 302, but any sudden voltage change local to one VSC will still result in a voltage change being experienced at all other network terminals. In such an arrangement the conventional control described could lead to issues with global network stability as any individual converter may undergo a relatively sudden change in local DC voltage to maintain DC current in the event of a transient. It will be noted that each VSC maintains its own DC current. Unlike the DC voltage therefore the DC current is thus a local quality.

Embodiments of the application thus relate to methods and apparatus for control of VSCs that at least mitigate at least some of the disadvantages referred to above.

Thus according to the present invention there is provided a control apparatus for a voltage source converter comprising:

a reference voltage generator configured to generate a voltage control signal as part of a voltage control loop; and an overcurrent controller configured to generate a current control signal for modulating the voltage control signal to prevent an overcurrent;

wherein the overcurrent controller generates the current control signal as part of a control path that is independent from the voltage control loop.

The reference voltage generator generates the voltage control signal, for instance a voltage reference for a valve of the voltage source converter (VSC), so as to maintain the DC voltage in the event of relatively short term transients. This helps prevent relatively sudden changes in DC voltage in the event of transient and leads to a greater stability of DC voltage, which may provide a more stable DC network. To prevent an overcurrent through the VSC the overcurrent controller may generate a current control signal for modulating the voltage control signal. The overcurrent controller does not however form part of the voltage control loop and the current control signal is generated in an independent control path. The overcurrent controller may thus influence the voltage control signal only when required and apart from when the VSC is at risk of an overcurrent the dynamic response of the VSC will be determined by the reference voltage generator. The reference voltage generator thus acts to control the VSC to behave as a voltage source, with the overcurrent controller providing current limiting if required so that the VSC behaves as a current limited voltage source.

The reference voltage generator may be configured to receive at least one feedback signal of DC voltage and/or power and generate the voltage control signal based on said feedback signal and a defined operating set-point. The reference voltage generator may be a DC voltage/power controller selectively operable in a voltage control mode to regulate the DC voltage of the voltage source converter and in a power control mode to regulate power flow via the voltage source converter. The DC voltage/power controller may be responsive to a network controller to operate in said voltage control mode or said power control mode.

The overcurrent controller may be configured to receive a current feedback signal indicative of current flowing in the voltage source converter and a defined current limit.

The overcurrent controller may have a bandwidth that is faster than a bandwidth of the voltage control loop. The bandwidth of the voltage control loop may be such that the voltage control signal generated by the reference voltage generator does not vary significantly over the timescales associated with short term transient events. This means that the voltage control signal applied to VSC acts to maintain the DC voltage in the event of such a transient. The bandwidth of the overcurrent controller, i.e. an overcurrent control loop, is sufficiently fast so as to react to any significant current increases associated with such transients so as to apply current limiting if required.

The overcurrent controller may be configured to output a current control signal with a non-zero value only if the overcurrent controller detects that the voltage source converter is at or near an overcurrent limit.

The VSC may comprising a plurality of converter arms, with at least one, or possibly each, converter arm, comprising a control apparatus as described in any of the variants above. The or each converter arm may comprise a chain-link circuit comprising a plurality of series connected cells, each cell comprising an energy storage element and a switch arrangement for selectively connecting the energy storage element between terminals of the cell or bypassing the energy storage element. In other words the VSC may be an MMC or AAC type converter or variant having a plurality of modules with embedded energy storage for voltage wave-shaping.

Embodiments also relate to a power transmission system comprising a plurality of such voltage source converters connected to a DC network. The number of VSCs connected to the DC network may be three or more, i.e. embodiments relate to power transmission/distribution systems with a common DC network connected to three or more VSCs.

In another aspect there is provided a method of controlling a voltage source converter comprising:
generating a voltage control signal as part of a voltage control loop; and
generating a current control signal for modulating the voltage control signal to prevent an overcurrent;
wherein the current control signal is generated as part of a control path that is independent from the voltage control loop.

The method may be implemented in any of the variants as described above in relation to the control apparatus.

In particular the reference voltage generator may receive at least one feedback signal of DC voltage and/or power and generate the voltage control signal based on said feedback signal and a defined operating set-point. The reference voltage generator may be a DC voltage/power controller and the method may comprise operating the DC voltage/power controller in a selected one of a voltage control mode to regulate the DC voltage of the voltage source converter and a power control mode to regulate power flow via the voltage source converter. The DC voltage/power controller may be responsive to a network controller to operate in said voltage control mode or said power control mode.

An overcurrent controller may be configured to receive a current feedback signal indicative of current flowing in the voltage source converter and a defined current limit and generate the current control signal. The current control signal may have zero value unless the current feedback signal exceeds the defined current limit. The overcurrent controller may have a bandwidth that is faster than a bandwidth of the voltage control loop.

The voltage control signal may be a voltage reference for a converter arm of the voltage source converter. The converter arm may comprise a chain-link circuit comprising a plurality of series connected cells, each cell comprising an energy storage element and a switch arrangement for selectively connecting the energy storage element between terminals of the cell or bypassing the energy storage element.

The voltage source converter may be one of three or more voltage source converters connected to a DC network.

In general embodiments relate to a control apparatus for controlling a VSC to behave as a voltage source, in particular a current limited voltage source.

BRIEF DESCRIPTION OF THE DRAWINGS

Embodiments of the present disclosure will now be described, by way of example only, with reference to the accompanying drawings, of which.

DETAILED DESCRIPTION

Embodiments of the present disclosure relates to methods and apparatus for control of operation of a voltage source converter (VSC). In embodiments of the disclosure the VSC is controlled based on a voltage reference that is generated by a DC voltage reference generator which may be a DC voltage/power controller. The voltage reference may thus be determined directly by a DC voltage/power controller as part of a voltage control loop, rather than by specifying an intermediate current reference for use by a current controller of an inner current control loop as in the conventional control. An overcurrent controller is provided for current limiting purposes, but the overcurrent controller is in a parallel control path to the DC voltage reference generator, i.e. the DC voltage/power controller, and which generates a current control signal which does not directly depend on the output of the DC voltage reference generator. Current limiting may be applied only when required.

Figure 4:
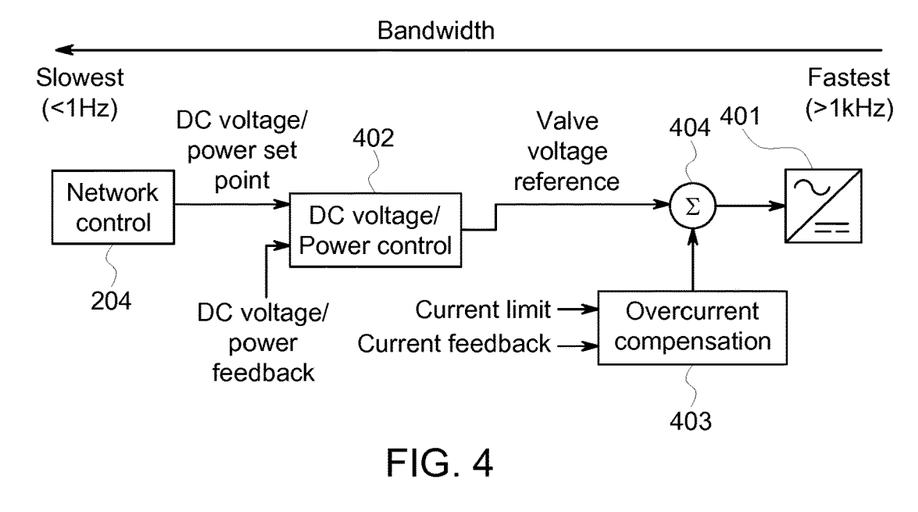
FIG. 4 illustrates the principles of VSC valve control according to an embodiment.

FIG. 4 illustrates the principles of control according to an embodiment. A voltage reference is determined for a VSC 401, e.g. a valve voltage reference such as discussed previously, but in embodiments of the disclosure a DC voltage reference generator, which may be a DC voltage/power controller 402 forming part of a voltage control loop for DC voltage/power regulation, determines the DC portion of the voltage reference, e.g. defines the DC offset. The DC voltage/power controller 402 thus receives an indication of a required operating mode (power or DC voltage regulation) and set point from a network controller 204 in a similar fashion to the outer loop controller 203 described with reference to FIG. 2. In use DC voltage/power controller 402 also receives an indication of the DC voltage/power of the VSC, e.g. a monitored DC voltage and/or power. However in embodiments of the present disclosure the DC voltage/power controller 402 directly generates the voltage reference for the VSC, rather than generating an intermediate current reference as described with reference to FIG. 2.

The bandwidth of this DC voltage/power controller 402 may be similar to that of the outer loop control described with reference to FIG. 2. Thus the response time of DC voltage/power controller 402 may be relatively slower than the typical time constants associated with DC network dynamics. In such a case, for any transients having faster dynamics than the bandwidth of the DC voltage/power controller 402, the valve voltage reference would remain substantially constant during the transient and thus the DC voltage would remain substantially constant.

As noted previously, with the conventional VSC control described with reference to FIG. 2, in the event of such a transient the fast current controller 202 would quickly act to maintain the current, with a possible consequent change in DC voltage. The VSC according to the conventional control in effect acts as a current source. Using the control illustrated in FIG. 4 however the VSC instead acts to maintain DC voltage and thus, in effect, acts as a voltage source.

The control uses the inherent energy storage capability of the chain-link cells of the VSC to assist the DC network in maintaining the DC voltage to a relatively constant value. The control thus allows the VSC to rapidly absorb energy from the DC network or provide additional energy as required so as to maintain the DC voltage in the event of a disturbance.

Such operation could however potentially result in relatively large current demand to maintain the DC voltage in the event of a relatively large disturbance. As noted previously the semiconductor devices used in conventional VSCs may typically have relatively low tolerance for overcurrents. In embodiments of the present invention an overcurrent controller 403 may be provided so as to modify the voltage reference generated by the DC voltage/power controller 402 so as to prevent overcurrent.

The overcurrent controller 403 may thus receive a current feedback signal indicative of a monitored VSC current and also a defined current limit and act, if necessary, to modify the voltage reference to provide current limiting. The overcurrent controller 403 may generate a current limiting control signal for modulating the voltage reference if required. The current limiting control signal may be combined with the voltage reference generated by the DC voltage/power controller 402 by combiner 404. To provide good protection against any overcurrent, the bandwidth of the overcurrent controller 403 should be relatively fast with respect to the time constants of the likely transients of interest. For instance the bandwidth of the overcurrent controller 403 may be similar to the bandwidth of the current controller 202 of the conventional control scheme, e.g. typically in or near the kilohertz range.

The bandwidth of the overcurrent controller and also of the DC voltage/power controller 402 will depend on the relevant control platform. In most implementations the ratio between the bandwidth of the DC voltage/power controller and current controller may be at least two, but in some practical implementation the ratio may be in the order of ten.

The overcurrent controller 403 is provided in parallel to the main DC voltage/power controller 402. Thus the DC voltage/power controller 402 is provided as part of a DC voltage control loop for the VSC. This DC voltage control loop has a feedback path for providing the DC voltage/power feedback signal to the DC voltage/power controller 402. The DC voltage/power controller 402 generates the voltage reference as a voltage control signal. A feedforward path for this DC voltage control signal extends from the DC voltage/power controller 402 to the valve 401. The overcurrent controller 403 is located in a separate control path and applies overcurrent limiting to the voltage control signal in the feedforward path. By separate control path is meant that the overcurrent controller 403 does not itself receive the DC voltage control signal as a control input for determining any current limiting to be applied. In other words the control signal for current limiting which is generated by the overcurrent controller 403 is derived independently of the voltage control signal itself.

It will therefore be appreciated that the overcurrent controller 403 serves a quite different purpose and operates in quite a different way to the current controller 202 described with reference to FIG. 2. In the conventional control described with reference to FIG. 2 the current controller 202 is part of an inner current loop which is responsive to the slower outer control loop. The current controller 202 is thus located in the feedforward control path from the DC voltage/power controller 203 to the valve. The voltage reference generated by the current controller 202, which provides current control of the valve current, is derived based on, and depends upon, the output of the DC voltage/power controller 203.

In addition the current controller 202 of the conventional control scheme is active at all times so that the current control 202 continuously defines the VSC voltage reference and thus defines the dynamic response of the VSC (within the bandwidth of the current control). At all times it controls the VSC so as to effectively act as a current source.

By contrast the overcurrent controller 403 may actively provide current limiting only when required. Although the overcurrent controller 403 may continuously monitor the feedback current against the defined limit the overcurrent controller 403 may only be active to modulate the actual voltage reference if there is a danger of an overcurrent. For example unless the VSC is at risk of an overcurrent any output of the overcurrent controller 403 may be such that it has no substantially effect on the VSC dynamic response. Thus the VSC behaves as a voltage source as far as possible and in essence behaves, including the operation of overcurrent controller 403, as a current limited voltage source.

The control scheme of FIG. 4 thus provides greater stability of the DC voltage in the event of transients than the conventional control scheme. This can be advantageous, especially for power distribution/transmission with a multi-terminal DC network, i.e. with three or more VSCs connected to a common DC network, as DC voltage can be seen as a stability measure for DC networks.

Figure 5:
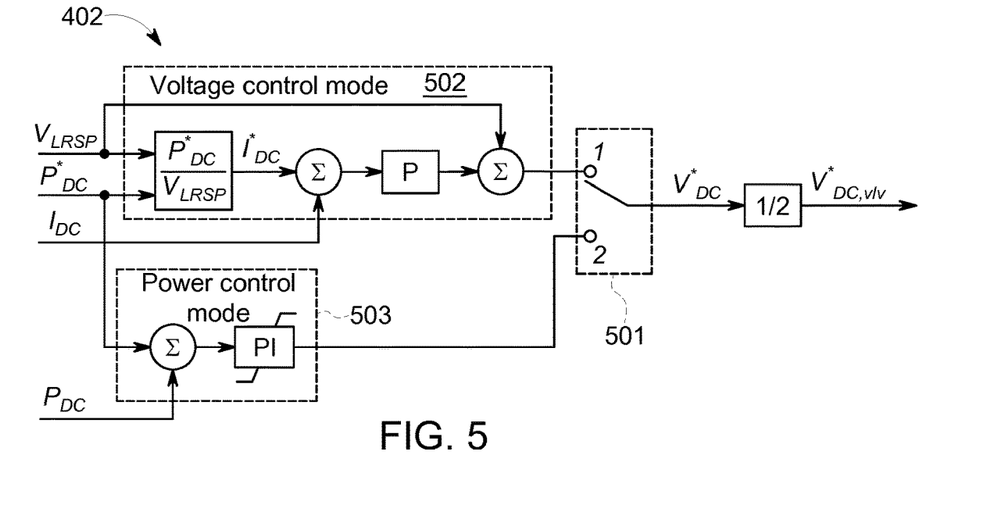
FIG. 5 illustrates one example of a DC voltage/power controller suitable for use in an embodiment.

There are various ways in which the control scheme could be implemented in a practical VSC. FIG. 5 illustrates one example of a suitable DC voltage/power controller 402.

The controller 402 may operate in a voltage control mode or a power control mode, for example by operating a control mode selector 501. For the voltage control mode a voltage control module 502 receives operating set points for DC voltage ($V_{LRSP}$) and DC power ($P^*_{DC}$) from an upstream control layer, e.g. Network control, or from the converter operator. These set points correspond to the DC voltage and DC power that converter should produce at the DC terminals (assuming there is no disturbance or uncertainties in the system).

The DC voltage set point is fed forward to the output of the voltage control module 502 and is added to the output of a proportional current error loop to formulate the DC voltage reference for the converter ($V^*_{DC}$). The DC voltage reference for the phase limb may be divided by two to provide the DC offset of the valve voltage reference of each valve ($V^*_{DC,vlv}$).

The current error loop output in this example is produced by scaling the error between a reference DC current ($I^*_{DC}$) and the measured DC current signal ($I_{DC}$) by a proportional gain. The reference current reference ($I^*_{DC}$) may be calculated as product of DC power set point and the inverse of the DC voltage set point.

It should be noted that the current error loop described in this example does not operate to regulate the output DC current, instead its function is to provide a current dependent slope to the DC voltage control characteristic. Such a slope, often referred to as droop, is desirable when the control of the DC transmission system voltage should be shared between several AC/DC converters. If there were no need for such sharing the proportional gain of the current error function can be set to zero and the DC voltage controller becomes a straight feedthrough of the DC voltage set point to the valve voltage reference DC offset calculator (i.e. division of converter DC voltage reference by two).

When in DC power control mode a power control module 503 receives DC power set point ($P^*_{DC}$) and a measured converter DC power signal ($P_{DC}$). The controller 402 calculates the error between the set point and the measured power and feeds this error to a proportional-integral (PI) controller. The PI controller modulates the converter DC voltage reference ($V^*_{DC}$) to achieve the target DC power. As with the DC voltage control mode, the DC offset for the valve voltage reference signals may be calculated as half of the converter DC voltage reference. The PI controller may be implemented with an output limitation and integrator anti-windup loop as would be understood by one skilled in the art.

Figure 6:
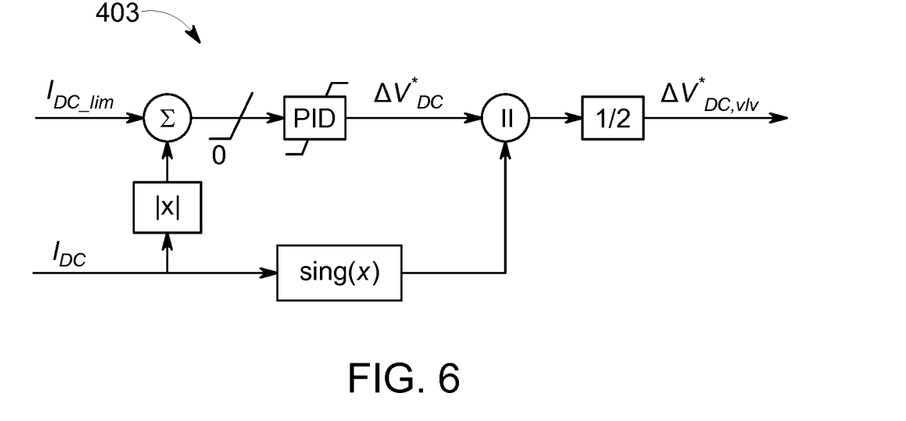
FIG. 6 illustrates one example of an overcurrent controller suitable for use in an embodiment.

As was illustrated in FIG. 4 the valve voltage reference, or at least the DC component thereof, may be summed with the output of the overcurrent controller 403. FIG. 6 illustrates one example of a suitable overcurrent controller 403.

The overcurrent controller 403 calculates the error between a DC current limit ($I_{DC\_lim}$) and the absolute value of measured DC current ($I_{DC}$). This error is passed through a proportional-integral-derivative controller (PID) that generates a modulating value for the converter DC voltage reference ($\Delta V^*_{DC}$). That modulating value is multiplied by the sign of the measured DC current feedback signal. Such multiplication is employed to give the modulating value a correct sign depending on the converter operating mode— rectifying or inverting. The product of the modulating value for the converter DC voltage reference and measured DC current feedback is divided by two to become the modulating value for each of the valve voltage references ($\Delta V^*_{DC,vlv}$). As illustrated in FIG. 4, this value is added to the main DC voltage offset produced by the DC voltage/ Power control and such modulated DC voltage offset is used as the DC portion of the valve voltage reference. It should be noted that the input to the PID controller is limited to non-negative values, so the overcurrent compensator is only effective when the measured converter DC current is greater than the limit value—i.e. when there is an overcurrent condition. For negative current error, i.e. when the converter current is within the normal range, the overcurrent current compensator produces zero output, so does not affect the DC offset given by the DC voltage/Power control. In some embodiments the control structure shown in FIG. 6 could be modified by adding a derivative term to the current error calculation, so the compensator acts not only when the converter is in an overcurrent state, but also if the converter at a risk of overcurrent.

Embodiments of the present disclosure thus relate to methods and apparatus for control of a VSC that act to control the VSC so that is behaves as a voltage source, and in particular as current limited voltage source. As discussed the control apparatus controls the VSC to act as a current limited voltage source by using the embedded energy storage of the VSC to provide or absorb energy from the connected DC system as required to maintain the DC voltage.

This does require that the voltages of the energy storage elements of the cells of the chain-link can be maintained at the desired voltage level. Converter energy control and cell capacitor voltage balancing control is known for the conventional control and can be readily adapted for the control described above.

Embodiments of the present invention thus relate to control apparatus for VSCs and method of control of VSCs that provide good DC voltage stability in a connected DC network. A controller, such as a DC voltage/power control generates a DC voltage reference based on a monitored DC voltage/power and a specified set-point. The DC voltage reference is generated with a bandwidth such that during a network transient the DC voltage reference remains substantially constant. A faster acting overcurrent controller is provided for current limiting where the overcurrent controller generates a control signal for current limiting which is derived without using the voltage reference as a control input.

VSCs controlled in this way may be used in HVDC power distribution/transmission systems. A first VSC according to an embodiment may be arranged for the transfer or power to/from a second VSC, which may or may not be a VSC according to an embodiment of the invention. In some embodiments the first VSC could be part of a multi-point network with multiple other VSCs connected to the same DC grid.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units

What we claim is:

1. A control apparatus for a voltage source converter comprising:
a reference voltage generator configured to generate a voltage control signal as part of a voltage control loop; and
an overcurrent controller configured to generate a current control signal for modulating the voltage control signal to prevent an overcurrent,
wherein the overcurrent controller generates the current control signal as part of a control path that is independent from the voltage control loop, and
wherein the overcurrent controller is configured to output a current control signal with a non-zero value only if the overcurrent controller detects that the voltage source converter is at or near an overcurrent limit.

2. The control apparatus as claimed in claim 1, wherein the reference voltage generator is configured to receive at least one feedback signal of DC voltage and/or power and generate the voltage control signal based on said feedback signal and a defined operating set-point.

3. The control apparatus as claimed in claim 1, wherein the reference voltage generator is a DC voltage/power controller selectively operable in a voltage control mode to regulate the DC voltage of the voltage source converter and in a power control mode to regulate power flow via the voltage source converter.

4. The control apparatus as claimed in claim 3, wherein the DC voltage/power controller is responsive to a network controller to operate in said voltage control mode or said power control mode.

5. The control apparatus as claimed in claim 1, wherein the overcurrent controller is configured to receive a current feedback signal indicative of current flowing in the voltage source converter and a defined current limit.

6. The control apparatus as claimed in claim 1, wherein the overcurrent controller has a bandwidth that is faster than a bandwidth of the voltage control loop.

7. A voltage source converter comprising a plurality of converter arms, at least one converter arm comprising a control apparatus as claimed in claim 1.

8. The voltage source converter as claimed in claim 7, wherein said at least one converter arm comprises a chain-link circuit comprising a plurality of series connected cells, each cell comprising an energy storage element and a switch arrangement for selectively connecting the energy storage element between terminals of the cell or bypassing the energy storage element.

9. A power transmission system comprising a plurality of voltage source converters as claimed in claim 7, connected to a DC network.

10. The power transmission system as claimed in claim 9 wherein the number of said voltage source converters connected to the DC network is three or more.

11. A method of controlling a voltage source converter comprising:
generating a voltage control signal as part of a voltage control loop; and
generating a current control signal for modulating the voltage control signal to prevent an overcurrent,
wherein the current control signal is generated as part of a control path that is independent from the voltage control loop, and
wherein an overcurrent controller is configured to output a current control signal with a non-zero value only if the overcurrent controller detects that the voltage source converter is at or near an overcurrent limit.

12. The method as claimed in claim 11 wherein a reference voltage generator receives at least one feedback signal of DC voltage and/or power and generates the voltage control signal based on said feedback signal and a defined operating set-point.

13. The method as claimed in claim 11, wherein the reference voltage generator is a DC voltage/power controller and the method comprises operating the DC voltage/power controller in a selected one of a voltage control mode to regulate the DC voltage of the voltage source converter and a power control mode to regulate power flow via the voltage source converter.

14. The method as claimed in claim 13, wherein the DC voltage/power controller is responsive to a network controller to operate in said voltage control mode or said power control mode.

15. The method as claimed in claim 11, wherein the overcurrent controller has a bandwidth that is faster than a bandwidth of the voltage control loop.

16. The method as claimed in claim 11, wherein the voltage control signal is a voltage reference for a converter arm of the voltage source converter where said converter arm comprises a chain-link circuit comprising a plurality of series connected cells, each cell comprising an energy storage element and a switch arrangement for selectively connecting the energy storage element between terminals of the cell or bypassing the energy storage element.

17. The method as claimed in claim 11, wherein the voltage source converter is one of three or more voltage source converters connected to a DC network.

18. A control apparatus for a voltage source converter comprising:
a reference voltage generator configured to generate a voltage control signal as part of a voltage control loop; and
an overcurrent controller configured to generate a current control signal for modulating the voltage control signal to prevent an overcurrent,
wherein the overcurrent controller generates the current control signal as part of a control path that is independent from the voltage control loop, and
wherein the reference voltage generator is configured to receive at least one feedback signal of DC voltage and/or power and generate the voltage control signal based on said feedback signal and a defined operating set-point.

* * * * *